United States Patent Office 3,460,762
Patented Aug. 12, 1969

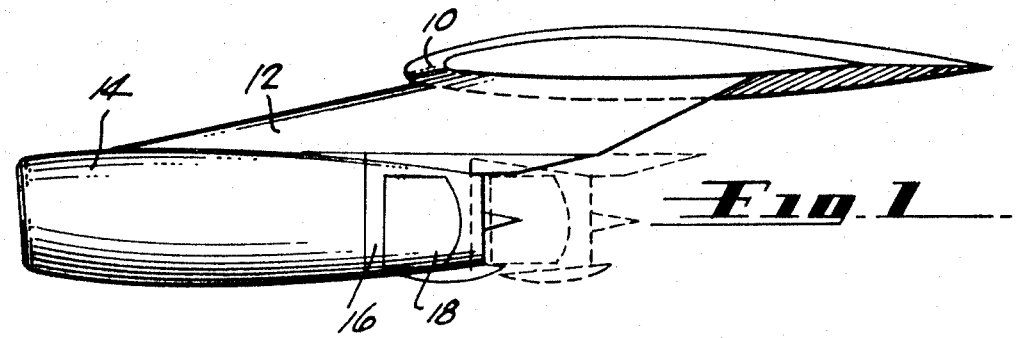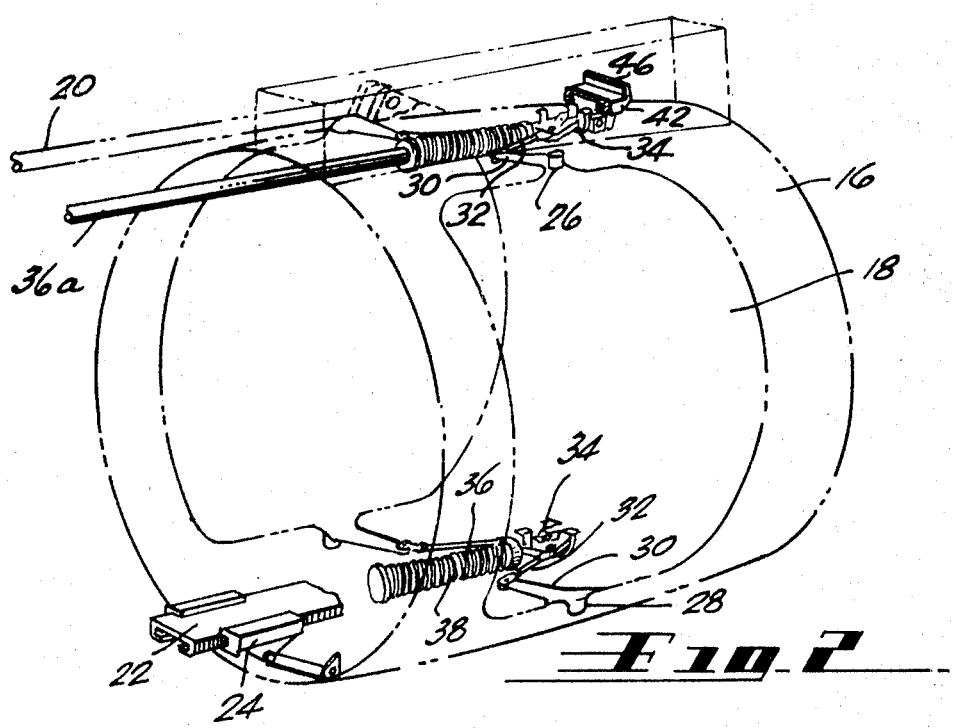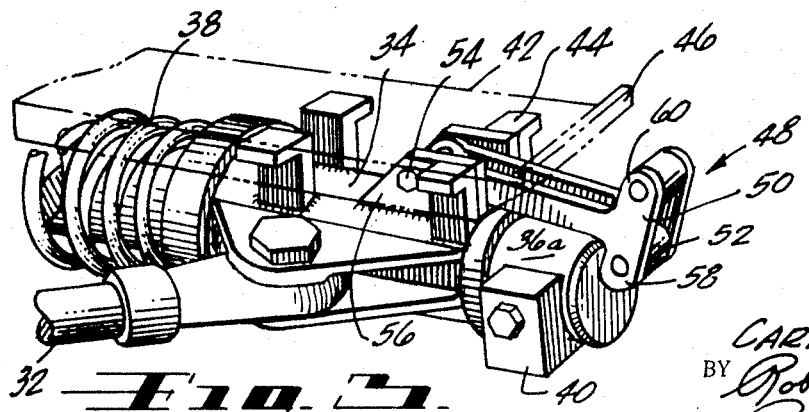

3,460,762
THRUST REVERSER ROLLER LATCH
Carl A. Weise, San Pedro, Calif., assignor to McDonnell Douglas Corporation, a corporation of Maryland
Filed July 24, 1967, Ser. No. 655,485
Int. Cl. B65c *15/04;* B64b *1/36;* F02k *1/24*
U.S. Cl. 239—265.29    4 Claims

ABSTRACT OF THE DISCLOSURE

This invention relates to apparatus for reversing the gas discharge of a jet aircraft engine wherein the reversing bucket ring first translates rearwardly before the buckets turn inwardly to their reverse position, and wherein the buckets must return to their stowed position before the ring can be moved forward to the normal flight position. The roller latch is a feature which insures that the buckets are properly oriented before the ring can move forward again.

Background of the invention

Jet deflectors have been devised for deflecting the gases forwardly that normally pass rearwardly from a jet engine in the propulsion of an aircraft. This forward deflection of the gases provides a reverse thrust to decelerate the aircraft, in the air or on the ground, in a manner that is similar to the reverse thrust created when propeller blades are reversed in pitch. These thrust reversers mechanically block or deflect the engine exhaust emitting from the tail pipe. One such device consists of a pair of symmetrical blocker doors or buckets that are pivotally mounted within the engine cowling and arranged to come into abutment in the center of the exhaust gas stream to cause an outward deflection of the exhaust. In the thrust reversing position, these buckets must extend rearwardly of the engine and in the path of the exhaust gases. However, in their storage position they must have a minimum of aerodynamic drag. To accomplish this effect, the buckets must move forwardly and disappear into the housing structure. To accomplish both of these features, the buckets are mounted in a translating ring which is moved between the forward or stored position and an aft or reversing position.

One such thrust reverser is shown and described in co-pending application number 617,888, filed Feb. 23, 1967, now Patent No. 3,419,218 by Mark R. Campbell and Lyle A. Wright and assigned to a common assignee. Reference is made to that application for further background information. The invention in that application further included a fail safe feature wherein should the translating ring become jammed in its aft position wherein the buckets were in reversed position, the buckets may be returned to a normal non-reversing position even though the ring remains in the aft position. At all times a spring tends to return the buckets to a non-reversing position. A problem exists, however, if the springs should break or lose their resiliency or be overpowered by forces exerted by the air stream in some manner. Under these circumstances, forward translation of the ring to its normal flying position might not return the buckets from their reversing position to their stowed position, in which case the buckets could be damaged or cause damage to other parts, such as the exhaust nozzle, with resultant malfunctioning.

Summary of the invention

The above problem has been overcome in the present invention with a roller latch assembly which prevents forward translation of the ring until after the buckets have been returned from the reversing position to their stowed position so that the forward translation of the ring and the buckets will not subject the buckets to possible damage. In addition, the buckets are locked in the stowed position continuously while the ring is forward of the reverse position.

In a more general application, the invention consists of a means (roller latch assembly) for locking a first member (a slider) relative to one of two other members (stop near the end of a rod or the end of a track), the choice of which is determined by the relative positions of the other members. This locking condition remains until the other members (stop near the end of the rod and end of track) are in another position relative to each other, at which time the first member (slider) is locked relative to the other of the members (stop near end of rod or end of track). The latching assembly actuates automatically in response to the relative positions and needs no additional controls or input source.

Brief description of the drawings

FIGURE 1 is a pictorial view showing the reverser apparatus in forward position with its reversing position shown in dash lines;

FIG. 2 is a schematic view of the reverser apparatus with the thrust reverser buckets in normal flying position;

FIG. 3 is an enlarged perspective view of the roller latch and associated structure;

Description of the present embodiments

Figure 5:
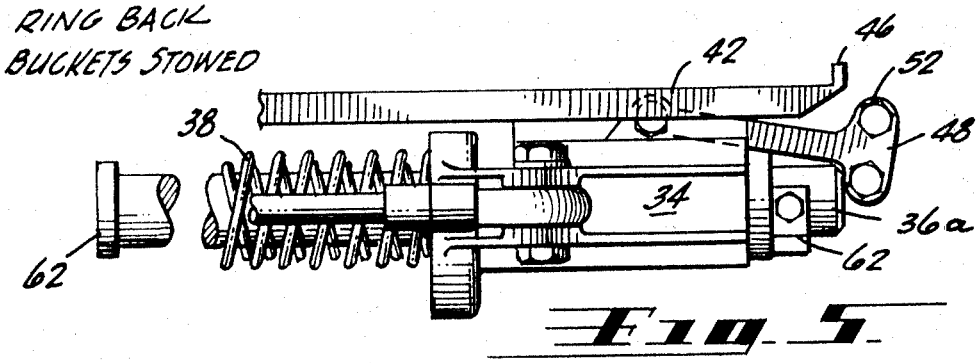
FIG. 5 is a side view of the roller latch wherein the slider has moved rearwardly to a position where the latch transfers position control from the end of the track to the end of the rod and the buckets start toward reverse position.

A thrust reverser utilizing the present invention is shown in FIG. 1 in conjunction with aircraft wing 10, pylon 12 and jet engine and cowling 14. The thrust reverser structure includes a translating ring 16 and reverser buckets 18. The solid lines of translating 18 and reverser buckets 20 represent the stowed position of the thrust reverser whereas the dotted lines represent the position of the thrust reverser in its reversing position.

In FIG. 2 there is shown a piston rod 20 which moves ring 16 between the two positions shown in FIG. 1. Track 22 is fixed to the engine and guides 24 are fixed to the ring and translate fore and aft on the track 22. The pair of buckets 18 are pivotally mounted on ring 16 in such manner that they each rotate toward the other at their aftmost edge when the ring 16 is extended rearwardly. The linkage connecting the buckets are similar to each other and the top and bottom linkages are similar. The buckets are symmetrically spaced on the translating ring and are of equal size. As shown, the pivot pins 26 and 28 are critically disposed to provide a pivot axis for bucket 18 normal to the path of the exhaust gases. Bucket arms 30 are attached at one end to the buckets at the pivot axis and at the other end to links 32 which in turn are connected to sliders 34. Sliders 34 are mounted on and translate relative to rods 36 and 36a. Springs 38 are positioned over rods 36 and 36a to continually encourage sliders 34 rearwardly and thus, tend to keep buckets 18 in stowed position, the position shown in FIG. 2 and shown in solid lines in FIG. 1. The structure at the upper portion of ring 16 is intended for actuation whereas the similar structure at the bottom is intended to prevent binding of the ring or buckets and thereby cause a possible malfunction. Rod 36a at the top of ring 16 is fixed at one end to the engine 14 and passes through the top slider 34. A stop member 40 shown in FIG. 3 limits the outward relative movement of slider 34 with respect to rod 36a. In this manner, when ring 16 is moved rearwardly, the slider 34 has a rearward limit after which there is relative motion with respect to ring 16. This, in turn, causes bucket arms 30 to rotate and thus move buckets 18 to their thrust reverser position across the exit path of the jet engine gases. Rod 36a may have a definite length to cause this actuation in a conventional manner or it may be of the fail safe configuration as shown and described in the above-referred to co-pending application, as will be mentioned again with reference to FIG. 6.

Figure 4:
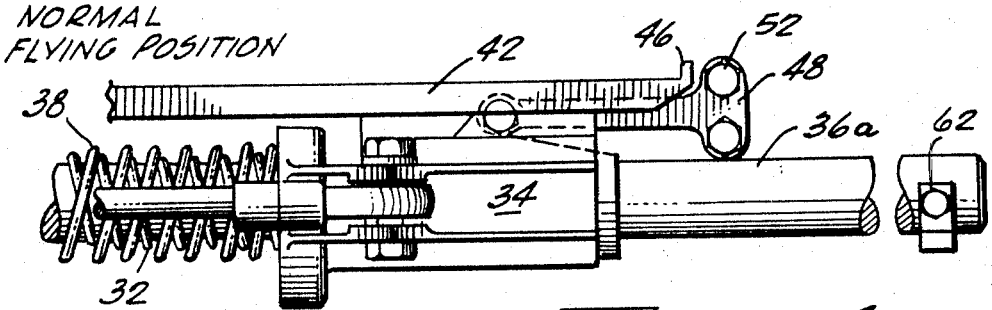
FIG. 4 is a side view of the roller latch wherein the slider is in position for normal aircraft flight.

Referring now to FIG. 3, there is shown in phantom lines the upper track 42 as a part of ring 16 and it is telescopically movable relative to the engine. Slider 34 has mounting brackets with outwardly extending ears 44 adapted to fit within channels on tract 42 for slidable movement therewith. Track 42 terminates at edge 46 whose position relative to the length of rod 36a and the position of slider 34 thereon regulates and is regulated by the roller latch assembly 48 which is pivotally mounted on slider 34. This roller latch consists of a pair of T frame members 50 having a pair of rollers 52 positioned therebetween. The upper roller is adapted to abut the upper surface of track 42 and the lower roller is adapted to roll along rod 36a when in the proper position. The inner end of the T frame members pivot at pivot points 54 on mounting brackets 56 which are fixed to slider 34. In the position shown in FIG. 3, the lower leg 58 has fallen down over and abuts against the end of rod 36a to prevent forward movement of slider 34 relative to the rod 36a. However, as will be seen in later figures, this limiting action applies only when the upper leg 60 is positioned under and abuts the under surface of track 42 as shown in FIG. 4. Thus a portion of the T frame member at all times extends into one of the spaced parallel relative paths of movement of rod 36a and track end 46.

In FIG. 4 the slider 34 is shown in its forward position on rod 36a and track 42 is forward of the stop member 62 on rod 36a. Stop 46 through latch 48 maintains slider 34 in a fixed position relative to ring 16. In this position the ring is full forward and the buckets are in stowed position as shown in FIG. 2. As previously mentioned, the forward end of rod 36a is affixed to the engine and for purposes of this discussion may be considered as a unitary piece of a predetermined length. However, as will be noted hereinafter, this rod also may be of a telescopic nature to permit the fail safe operation that is the subject matter of the above-referred to copending application. Track 42 moves with the ring as can be seen in this position, with the roller latch 48 in the up position such that the upper roller is rearwardly of edge 46 of track 42 and the lower roller rolls along the rod 36a. Any rearward movement of track 42, that is, rearward movement of the ring, requires that slide 34 also move rearwardly by the same amount. When this occurs, there is no pivoting action and link 32 does not actuate the buckets.

Figure 6:
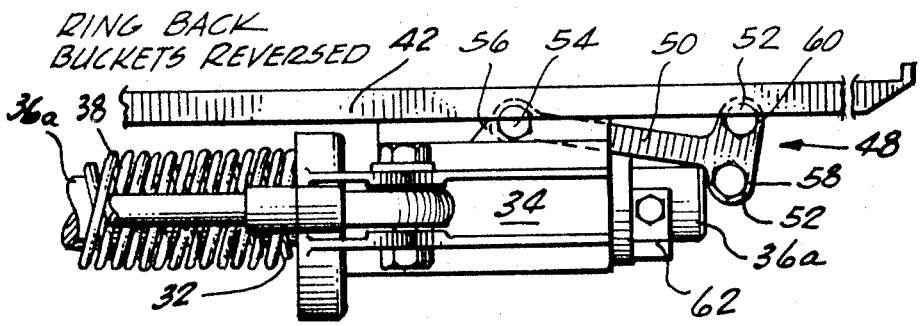
FIG. 6 is a side view of the roller latch with the rod and track in reverse position.

Referring now to FIG. 5, it can be seen that roller latch 48 has dropped down over the end of rod 36a and that slider 34 has reached stop 62. This means that track 42 and slider 34 have moved rearwardly together along with ring 16 but the buckets 18 have not yet been reversed. The ring 18 and track 42 are permitted an additional nine inches of rearward movement to accomplish the bucket reversing operation. This rearward movement while slider 34 abuts stop 62 on rod 36a, which in turn is fastened to the engine, causes compression of spring 38 since the forward end of spring 38 is affixed to the ring. With latch 48 in the down position, such as shown in FIG. 6, this additional rearward movement of track 42 for the purpose of reversing the buckets may be accomplished. Track 42 simply passes over the top roller 52 of the roller latch 48 and the rearward movement of the ring relative to the non-moving of slider 34, causes links 32 to actuate the buckets and move them to reversing position.

The above-referred to co-pending application mentions a fail safe condition wherein it may be desirable to return the buckets to a stowed position even when the ring is still in the rearward position. This is accomplished in the co-pending application by the release of a retaining latch to permit rod 36a to telescope and to move rearwardly. As can be seen in FIG. 6, any rearward movement of rod 36a together with its stop 62 will coincide with rearward movement of slider 34 and, of course, rearward movement of latch 48. Compressed spring 38 causes this rearward movement of slider 34 until latch 48 extends beyond the end 46 of track 42 and to resume the relative positions shown in FIG. 4, returning of the buckets to their stowed position.

In the absence of the operation of the fail safe feature just mentioned, the relative positions of the track latch rod and slider, while the buckets are in the reverse position, is shown in FIG. 6. In returning the ring to its forward position and the buckets to stowed position in the normal manner, track 42, and hence ring 18, must move forward the previously mentioned nine inches relative to slider 34 to thus stow the buckets, i.e., move the buckets from their non-reversing position. Latch 48 and springs 38 hold slider 34 against stop 62 on rod 36a to accomplish this relative movement between the slider and the ring and track 42. It can be seen that only when track 42 has moved forwardly, relative to 34, a sufficient amount, can roller latch 48 move upwardly and thus permit the ring to be returned to its forward position. Thus, in moving from aft to forward position, the relationship of parts changes from that shown in FIG. 6 to that shown in FIG. 5 wherein the track 42 has moved forwardly enough for roller latch 48 to extend beyond the end 46 of track 42. In this position, the buckets have been changed from their reversing position to their stowed position and the ring is still in the aft position. From the positions shown in FIG. 5, the ring is next moved forwardly and the relationship of parts is as shown in FIG. 4 wherein the ring, as exemplified by track 42, has moved forwardly with the buckets in stowed position.

I claim:
1. A latch (48) for locking a first member (34) relative to one of two other members (46, 62) in accordance with the relative positions of said two other members,
said latch being pivotally mounted on said first member (34) and adapted for alternative engagement with said other members,
said first member being a slider movable along part of a path of movement as one (46) of said other members moves along part of its path of movement, and
said other of said means (62) limiting further movement of said slider as said one (46) member completes its path of movement.

2. A latch as in claim 1 wherein said one (46) of said two other members moves rearwardly with a translating ring of a jet engine thrust reverser and wherein said other (62) of said members is a stop member to limit further rearward movement of a bucket actuating slider.

3. A latch as in claim 1 wherein said other members (46, 62) have relative movement therebetween in spaced parallel paths, and
wherein said latch (48) has a T frame whose legs extend into one of said paths.

4. A latch as in claim 2 wherein relative movement between said slider and said ring pivotally rotates thrust reversing buckets mounted on said ring.

References Cited

UNITED STATES PATENTS 2,588,914    3/1952    Dunham _____ 74—527

EVERETT W. KIRBY, Primary Examiner

U.S. Cl X.R.

60—232; 74—501; 244—52; 282—212